United States Patent [19]

Nelander et al.

[11] Patent Number: 4,781,209
[45] Date of Patent: Nov. 1, 1988

[54] SWITCH-OVER VALVE, PREFERABLY FOR AN AIR DRIER

[75] Inventors: Nils A. Nelander, Vintrie; Lars A. Övall, Löddeköpinge, both of Sweden

[73] Assignee: Garphyttan Haldex AB, Landskrona, Sweden

[21] Appl. No.: 115,907

[22] Filed: Nov. 2, 1987

[30] Foreign Application Priority Data

Nov. 3, 1986 [SE] Sweden ............... 8604687

[51] Int. Cl.⁴ .................................. F16K 11/00
[52] U.S. Cl. ............................... 137/119; 55/179
[58] Field of Search ..................... 55/179; 137/119

[56] References Cited

U.S. PATENT DOCUMENTS 2,821,972  2/1958  Banker ..................... 137/112 X
3,734,132  5/1973  Kuhnelt .................. 137/625.49
4,331,457  5/1982  Morner .
4,398,929  8/1983  Segersten .

FOREIGN PATENT DOCUMENTS 1235456  6/1971  United Kingdom ............... 137/119

Primary Examiner—Gerald A. Michalsky
Attorney, Agent, or Firm—Laurence R. Brown; Alfred J. Mangels

[57] ABSTRACT

A switch-over valve for directing a compressed air flow to either one of two drying towers of an air drier, the other one being vented to the atmosphere. The valve is arranged in a partition wall between the two towers, a conduit to the valve being provided in the partition wall. A valve body is axially movable in a cavity in the wall between two positions sealing off either one of the outlets from the cavity and keeping the other one open. A control piston with a greater length than the valve body is axially movable in a bore in the valve body and is biased towards a neutral position by spring means.

14 Claims, 3 Drawing Sheets

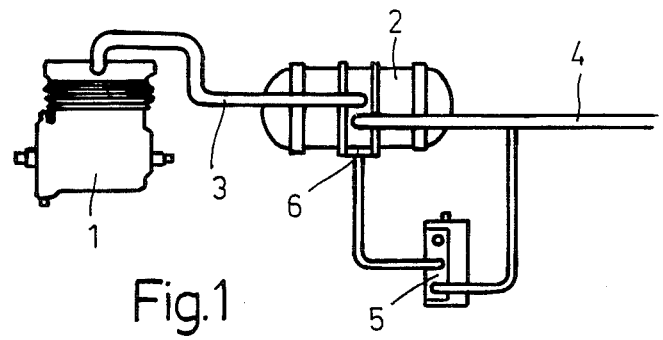
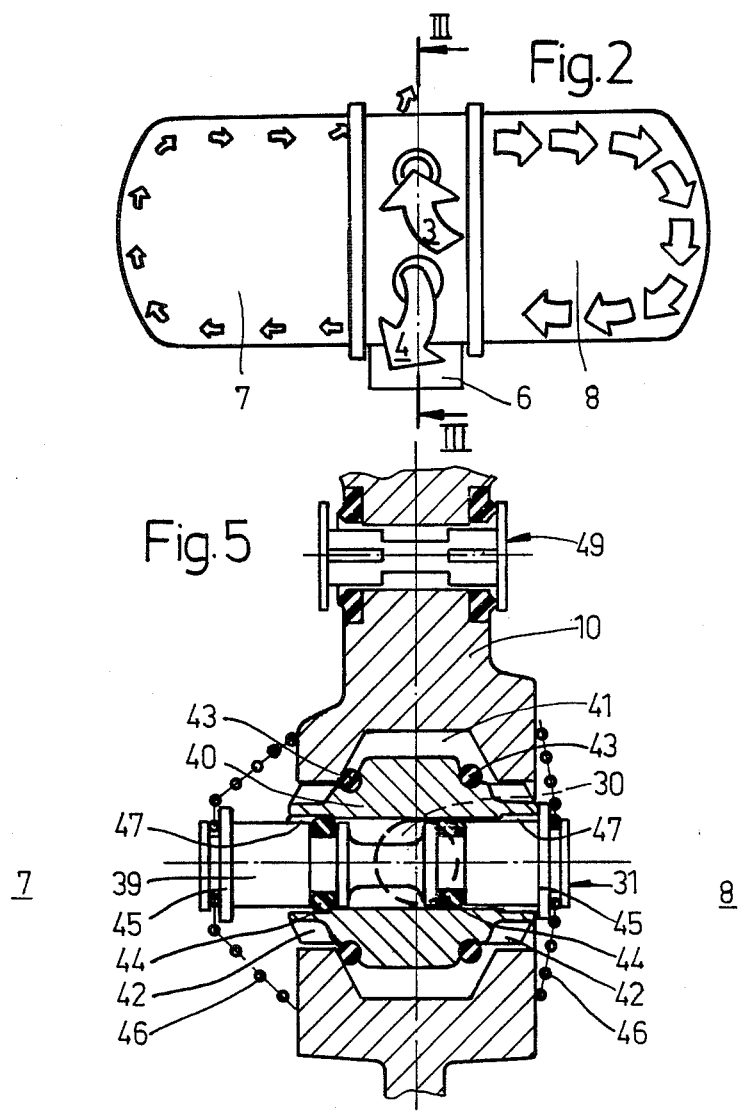

SWITCH-OVER VALVE, PREFERABLY FOR AN AIR DRIER

TECHNICAL FIELD

This invention relates to a switch-over valve for directing an air flow under pressure to either one of two compartments, the other one being vented to the atmosphere, wherein the valve is arranged in a partition wall separating the two compartments from each other and the air flow is directed to the valve through a conduit in said wall. The valve according to the invention can preferably but not exclusively be used for an air drier of the type having two drying towers.

BACKGROUND OF THE INVENTION

In an air drier of the type with two drying towers containing desiccant one of the towers is used for drying air emanating from the compressor in the system, while at the same time the desiccant in the other tower is regenerated by a small fraction of the dried air, which is passed back through the desiccant. The switch-over between the two towers is to be accomplished by a valve, which may be controlled to perform its function at each time the system is unloaded or in other words the pressure in the air tank to be fed by the compressor through the air drier has reached a certain level. In such a case the signal for the switch-over valve may be pneumatic.

Examples of prior designs of pneumatically controlled switch-over valves are shown in U.S. Pat. Nos. 4,331,457 and 4,398,929.

It is imperative that the switch-over valve at each and every operation reaches a position where one drying tower is sealed off and the other one connected to the conduit from the compressor irrespective of the strength of the pneumatic signal. In the opposite case, namely that the switch-over valve is stuck in an intermediate position, air from the compressor can be vented out into the atmosphere through the air drier without reaching the air tank. It goes without saying that such a situation cannot be tolerated.

THE INVENTION

The invention is based on the thought that the most reliable force for accomplishing the switch-over of the valve is the pressure of the air from the compressor. This force may according to the invention be utilized in a switch-over valve design, which is characterized in that a valve body is axially movable in a cavity in the partition wall between two positions sealing off either one of the outlets from the cavity to the compartments and keeping the other one open and in that a control piston with an axial length greater than that of the valve body is axially movable in a sealed-off fashion in a bore in the valve body and is biased towards a neutral position relative to the partition wall by spring means.

By this design the pressure acting on either end of the control piston has forced the piston to an end position together with the valve body. At unloading the spring means bring the control piston to a neutral position carrying the valve body towards its other end position for switching-over to the other compartment or drying tower.

The control piston may have a flange at each end for abutting the valve body. In this way the control piston has a distinct end position with a positive force transmission to the valve body not only dependent on the friction force.

The spring means for biasing the control piston towards a neutral position can preferably be a spiral compression spring provided at each end of the control piston and supported by the partition wall.

The control piston has to be sealed relative to the bore in the valve body. Further, a control force is to be transmitted from the control piston to the valve body. These two functions are accomplished in that the control piston is provided with two O-rings engaging the bore in the control piston.

In order to guarantee a proper switch-over of the control piston, even if the over-pressure forcing it to either of its end positions decreases during the switch-over process, the bore in the valve body towards each end has a portion with slightly enlarged diameter for cooperation with one of the O-rings. The result hereof is that after the switch-over process has started one of the O-rings enters an enlarged diameter portion leading to a decrease in the friction force that will have to be overcome by the force of the over-pressure.

The valve body is preferably guided for axial movements by cylinders with smaller diameter towards its ends cooperating with corresponding holes in the partition wall, these cylinders being provided with notches for allowing air to pass.

At each such transition to the cylinder with smaller diameter the valve body is provided with an O-ring for sealing engagement with a conical wall of the cavity.

BRIEF DESCRIPTION OF THE DRAWINGS

The invention will be described in further detail below reference being made to the accompanying drawings, in which FIG. 1 is an over-all view of parts of a compressed air system, for example on a heavy road vehicle, FIG. 2 is a side view of an air drier forming part of the system of FIG. 1, FIG. 5 is an enlarged view of the valve portion of FIG. 4.

DETAILED DESCRIPTION OF THE PREFERRED EMBODIMENT

Figure 3:
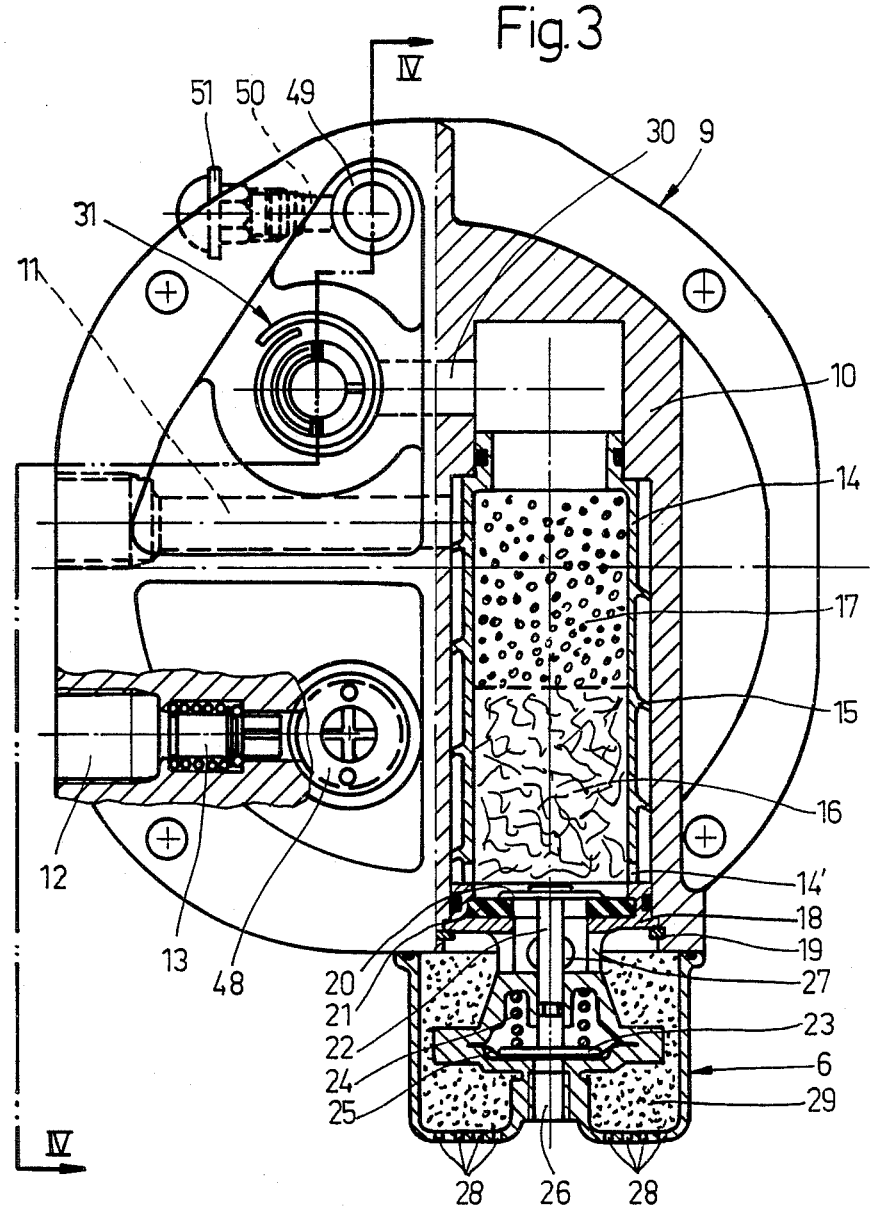
FIG. 3 is a mainly sectional view of the air drier along the line III—III in FIG. 2 but to a larger scale.

A compressed air system, typically but not exclusively to be used on heavy road vehicles, contains—as shown in FIG. 1—an air drier 2 (to be described below), a line 3 from the compressor 1 to the air drier, and a line 4 from the air drier to an air tank (not shown). When a certain working pressure is established and maintained in this air tank and thus in the line 4, a governor valve 5 provides a signal to an unloader valve 6 integrated in the air drier 2 for venting the air supplied by the compressor into the atmosphere.

Generally speaking and as shown in FIG. 2 the air drier according to the invention consists of a left drying tower 7, a right drying tower 8, and a centre part 9 containing valves and other means needed for the proper function of the air drier. Each drying tower 7 and 8 contains a filter and desiccant in a cartridge.

In use the compressed air flows through one of the towers to be dried (in FIG. 2 the right tower 8 as illustrated by bigger arrows). At the same time the other tower is regenerated, i.e. the desiccant therein is dried from the moisture adsorbed at its previous air drying cycle. The regeneration is performed in that a small amount of the dried air delivered from the air drier is passed through the tower to be regenerated and is then vented out to the atmosphere (as is illustrated by smaller arrows in the left tower 7 in FIG. 2).

As will be apparent below, the switch-over between the two towers occurs automatically at each signal in the form of a certain over-pressure in the line from the governor valve 5 to the unloader valve 6. In this way the air drier is always prepared for air treatment of large or small volumes.

FIG. 3 is a side-view, partly in section, of the centre part 9, which is completely divided into two halves by a partition wall 10 (more clearly shown in FIGS. 4 and 5) containing the different valves and filters to be described.

An air inlet duct 11 is to be connected to the line 3 from the compressor 1. An air outlet duct 12 is to be connectd to the line 4 to the air tank (not shown) and contains an ordinary spring-biased check valve 13 with the function to prevent air from the air tank from returning to the air drier when the pressure therein is lower than in the air tank.

The air inlet duct 11 leads to the upper part of a cylindrical compartment in the partition wall 10. In this compartment is arranged a cylindrical filter sleeve 14 having an external helical flange 15, which sealingly engages the compartment wall so as to form a helical path downwards outside the sleeve 14 for the air entering through the inlet duct 11.

The filter sleeve 14 is filled with metal wool 16 or similar material in its lower half and foam plastic 17 or similar material in its upper half. An unloader valve housing 18 sealingly engages the compartment under the filter sleeve 14 and is held in position by a spring ring 19. Holes 14' are provided in the bottom part of the sleeve 14 so as to allow entrance of air from the helical path outside the sleeve to the interior thereof.

An unloader valve 6 provided at the bottom portion of the centre part 9 has a valve disc 20 sealingly engaging a sealing ring 21 in the housing 18, a valve spindle 22 axially movable in the housing 18 and attached to the valve disc 20, and a diaphragm disc 23 attached to the spindle 22. A helical compression spring 24 acts on the diaphragm disc 23 in the direction for holding the valve disc 20 in sealing contact with the sealing ring 21. A diaphragm 25 is clamped in the housing 18 below the diaphragm disc 23 for sealing off a compartment at a connection 26 for a line from the governor valve 5 (see FIG. 1). The valve housing 18 has openings 27, and ventilating holes 28 are provided in the bottom of the valve housing 18, which contains sound absorbing material 29.

When the unloader valve 6 is closed (under the bias from the spring 24), which is the normal condition and means that air drying can take place, air flows at high speed in the helical path created by the helical flange 15. The helical path acts as a cyclone, so that water droplets and the like are separated from the air and gathered in the bottom region in the vicinity of the valve disc 20. This separation takes place without appreciably restricting the flow. After having passed into the filter sleeve 14 through the holes 14' the air then flows upwards through the material 16, where primarily oil contaminants and the like are separated or filtered off, and through the material 17, acting as a filter for other particles transported with the compressed air.

When the unloader valve 6 is opened due to a signal from the governor valve 5 in the form of an overpressure in the connection 26, the valve disc 20 is lifted from its sealing ring 21, so that the air from the compressor flows out into the atmosphere without appreciable restriction through the openings 27, the sound absorbing material 29, and the ventilating holes 28 and so that the overpressure in the whole air drier is lowered to atmospheric pressure. Hereby the water and the like gathered at the valve disc 20 is drained out, and the flow of air from the air drier to the atmosphere passes through the materials 17 and 16 conveying away oil, particles and the like gathered therein. The flow velocity can thereby be controlled by the choice of suitable material, especially the foam plastic 17, so that the desiccant in the respective drying tower 7 or 8 is not damaged.

As will be seen from the description below, the opening of the unloader valve 6 also has controlling effect on the function of the air drier, i.e. the switch-over of the air drying towers.

Figure 4:
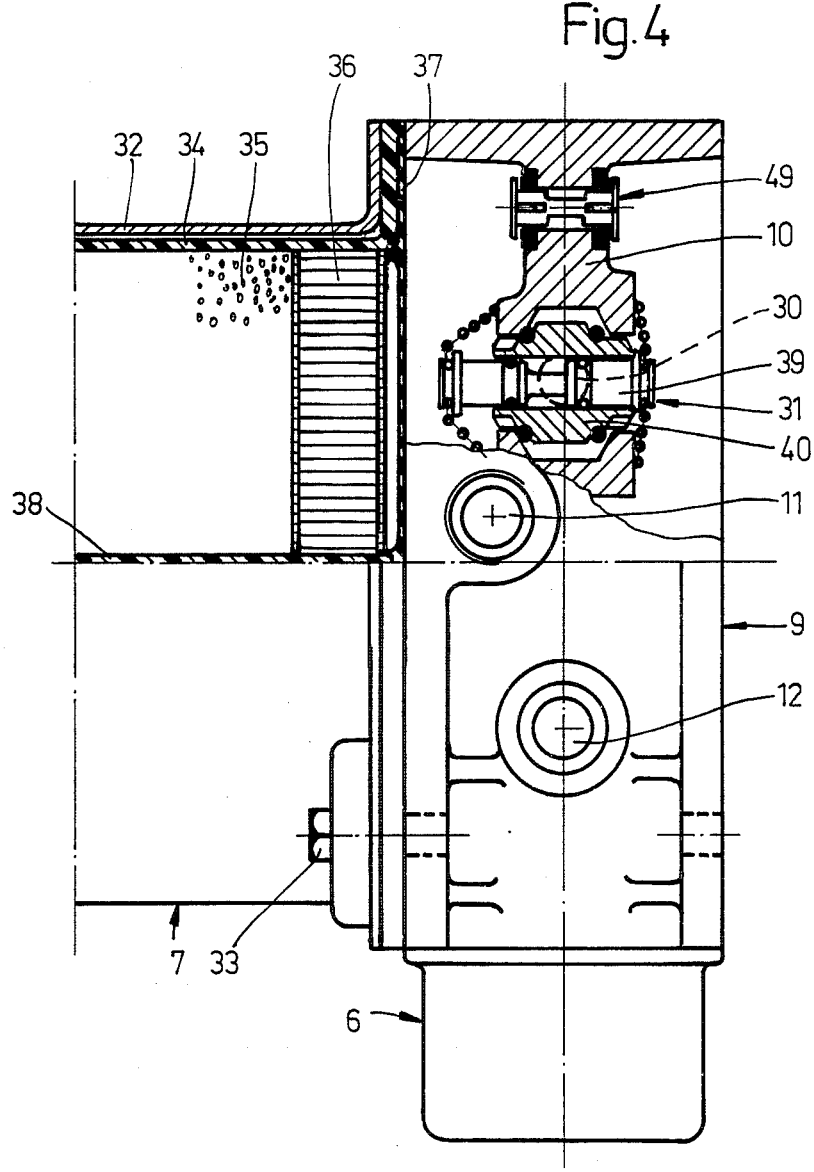
FIG. 4 is a mainly sectional view along the line IV—IV in FIG. 3.

From the separator and filter unit 14–17 as described above te compressed air flows through a conduit 30 to a switch valve 31 having the function to direct the air flow to either one of the two towers 7 and 8 in relation to the function of the unloader valve 6. This switch valve 31 is illustrated in FIG. 4 and—to a larger scale—in FIG. 5. Reference is being made to these two Figures.

Turning first to FIG. 4, the centre part 9 and a left drying tower 7 is shown therein; a right drying tower 8 (FIG. 2) of the same design as the left one is also attached to the centre part 9 but is excluded here for the sake of clarity.

The design of the drying towers 7 and 8 forms no part of the present invention, but a short description thereof is necessary for a proper understanding of the whole air drier.

Each drying tower has a dome-shaped container 32 attached to the centre part 9 by means of screws 33. It contains a plastic cartridge 34 substantially filled with desiccant 35 and a filter 36 at its open end facing the centre part 9. A cover 37 with through openings for air is attached to the cartridge at this end. There is a division wall 38 dividing the interior of the cartridge 34 into two halves, which are only open for air flow near the dome shaped end of the cartridge, where the division wall 38 is provided with an opening. The result of this is that air entering the tower through one half leaves it through the other, thus creating an air path which is twice as long as the length of the tower. Further division walls can be provided for increasing the length of the air path.

The switch valve 31 is in essence a so called flip-flop valve, controlled to be in either of its two positions by a control piston 39 axially movable in a valve body 40.

Reference is now being made to FIG. 5. The valve body 40 is axially movably arranged in a cavity 41 in the partition wall 10; the conduit 30 leads to this cavity 41. The valve body 40 has a generally cylindrical form. Towards its ends it has cylinders with smaller diameter corresponding to the diameter of partition wall holes guiding the valve body 40. In order to allow air to pass, the smaller valve body cylinders are provided with notches 42. At each transition to the smaller cylinder the valve body 40 is provided with an O-ring 43 for sealing engagement with a conical wall of the cavity 41.

The control piston 39 is axially movable in the valve body 40 and is sealed in relation thereto by two O-rings 44. At each end the control piston 39 is provided with a flange 45 and a spiral compression spring 46 supported by the partition wall 10. The spiral compression springs bias control piston 39 toward a neutral position within valve body 40.

The function of the switch valve 31 is as follows: Starting from the position shown in FIG. 5 (and FIG. 4) with the valve body 40 in its left hand position, compressed air from the conduit 30 flows to the right tower 8. Under the influence of the over-pressure therein the control piston 39 has been pushed to the left with its right hand flange abutting the valve body 40. The right hand spring 46 is hereby compressed, whereas the left hand spring is stretched-out.

When the unloader valve 6 opens at a signal from the governor valve 5, the pressure at either side of the partition wall 10 and thus of the switch valve 31 is equalized. This means that the control piston 39 moves towards a neutral position under the bias of the right hand compression spring 46 carrying the valve body 40 to the right with the right hand O-ring 43 engaging the conical wall of the cavity 41.

When the unloader valve 6 again closes and compressed air enters the cavity 41 through the conduit 30, it will flow to the left tower 7, where an over-pressure is created pushing the control piston to the right against the bias of the left hand spring 46, until the left hand flange 45 engages the valve body 40.

At the next unloading operation the sequence described above will be repeated but in the opposite direction of movement of control piston 39 and valve body 40, accomplishing a switch-over of air flow to the right hand drying tower 8.

As appears from FIG. 5, the bore for the control piston 39 in the valve body 40 has a portion 47 with slightly enlarged diameter towards each end with such a length that one of the O-rings 44 is positioned in one of the enlarged diameter portions 47 in each end position of the control piston 39 with a flange 45 abutting the valve body 40. The purpose of these enlarged diameter portions 47 is to guarantee a proper switch-over of the control piston 39 and thus of the whole valve 31, even if the over-pressure forcing the control piston 39 to either of its end positions decreases during the switch-over process. This is accomplished in that one of the O-rings 44 produces an initial resistance on leaving its enlarged diameter portion 47 and entering the normal diameter inner bore but thereafter needs less force from the over-pressure for its movement. Furthermore, the other O-ring 44 enters an enlarged diameter portion 47 towards the end of the movement leading to a further decrease in the friction force that will have to be overcome by the force of the over-pressure.

Two more valves are needed in the air-drier design in order to accomplish not only the main air drying function but also the simultaneous regeneration of the desiccant in the tower not used for drying, as generally described above in conjunction with FIG. 2. This regeneration is performed by a fraction of the dried air about to leave the air drier through the outlet 12.

Accordingly, a double-acting check-valve 48 (FIG. 3) with a small through bore is arranged in the vicinity of the outlet duct 12 in the partition wall 10. This valve 48 has the function to allow the main air flow out from the drying air tower (under pressure) and concurrently herewith to lead a fraction of this dry air back through the bore into the second tower for regenerating the desiccant therein.

In the vicinity of the switch-over valve 31 a second double-acting check valve 49 (FIGS. 4 and 5) is arranged in the partition wall 10. As most clearly appears from FIG. 5, this valve will be closed on the side towards the tower where the drying occurs (by the over-pressure therein) and open to the tower under regeneration for outlet of moist air through an outlet conduit 50 (FIG. 3) in the partition wall 10 and an outlet device 51.

Modifications are possible within the scope of the appended claims, which are not limited to the use of the invention in air driers.

We claim:

1. A switch-over valve for directing an air flow under pressure to either one of two compartments, the other compartment being vented to the atmosphere, wherein the valve is arranged in a partition wall separating the two compartments from each other and the air flow is directed to the valve through a conduit in the partition wall, said switch-over valve comprising: a cavity in the partition wall having an inlet and a pair of outlets; a valve body axially movable within the cavity between two positions sealing off either one of the outlets from the cavity to the compartments and keeping the other outlet open, the valve body including a bore extending therethrough between the compartments; a control piston positioned within the bore in the valve body and having an axial length greater than that of the valve body, the piston being axially movable in the bore in the valve body; and spring means for biasing the control piston towards a neutral position relative to the partition wall.

2. A valve according to claim 1, wherein the control piston includes a flange at each end for abutting engagement with the valve body.

3. A valve according to claim 1 wherein the spring means contacts the control piston at each end and includes a spiral compression spring supported by the partition wall.

4. A valve according to claim 1, wherein the control piston includes two O-rings, each of which is in sealing and frictional engagement with the bore in the valve body.

5. A valve according to claim 4, wherein the bore in the valve body at each end includes an enlarged diameter portion for cooperative engagement with a respective one of the O-rings on the control piston.

6. A valve according to claim 1, wherein the valve body is guided for axial movements within the cavity by end cylinders received within the cavity outlets, the end cylinders each having a smaller diameter than the valve body and being provided with notches for allowing air to pass between the end cylinders and the outlets.

7. A valve according to claim 6, wherein the valve body includes an O-ring adjacent each end cylinder for sealing engagement with an outlet of the cavity.

8. A valve according to claim 1, including resistance means positioned between the control piston and the valve body for providing positive shifting movement of the valve body axially within the cavity upon axial movement of the control piston.

9. A valve according to claim 8, wherein the resistance means are carried by the control piston.

10. A valve according to claim 8, wherein the resistance means include O-ring means carried by the control piston.

11. A switch-over valve for directing flow of a fluid from a single inlet to one of two outlets, said valve comprising:
(a) a housing defining a cavity having a pair of spaced outlet openings;
(b) a valve body within the cavity and slidably supported in the outlet openings for movement toward and away from each cavity outlet opening to selectively close one opening and open the other opening, the valve body including a pair of spaced sealing surfaces engageable with corresponding spaced inner surfaces at the cavity outlet openings, the sealing surfaces of the valve body spaced from each other a distance less than the spacing between the inner surfaces of the cavity outlet openings to permit movement of the valve body within the cavity and between the cavity outlet openings;
(c) inlet opening means communicating with the housing cavity to permit entry of pressurized fluid into the cavity;
(d) valve body actuation means slidably carried within the valve body for frictional engagement therewith for positively positioning the valve body against one of the cavity outlet openings to prevent flow therethrough while permitting flow through the other cavity outlet opening.

12. A valve according to claim 11, wherein the valve body actuation means include O-ring means carried by the control piston.

13. A switch-over valve having an inlet and a pair of outlets, said valve comprising:
(a) a hollow housing defining an inner cavity and including an inlet opening and first and second outlet openings, each of which openings is spaced from each other opening, the housing defining an inner cavity of greater cross-sectional area than the cross-sectional area of the inlet and outlet openings;
(b) a valve body carried by the housing and movable within the inner cavity between the first and second outlet openings to selectively open one of the outlet openings and close the other, the valve body having ends extending into the respective outlet openings in the housing;
(c) sealing means carried by the valve body for engagement with inner surfaces of the inner cavity adjacent each of the outlet openings for sealing off the respective outlet opening from the inner cavity;
(d) a control piston slidably carried within the valve body and having respective ends extending outwardly of the valve body, each end of the control piston defining a piston surface and including flange means selectively engageable with a respective end of the valve body to limit movement of the control piston relative to the valve body;
(e) spring means extending between respective ends of the control piston and the housing for biasing the control piston toward a neutral position within the valve body; and
(f) engagement means carried between the control piston and the valve body for shifting the valve body within the cavity upon movement of the control piston in response to a pressure differential between the ends of the control piston.

14. A valve according to claim 13, wherein the engagement means include O-ring means carried by the control piston.

* * * * *